Figure 1:
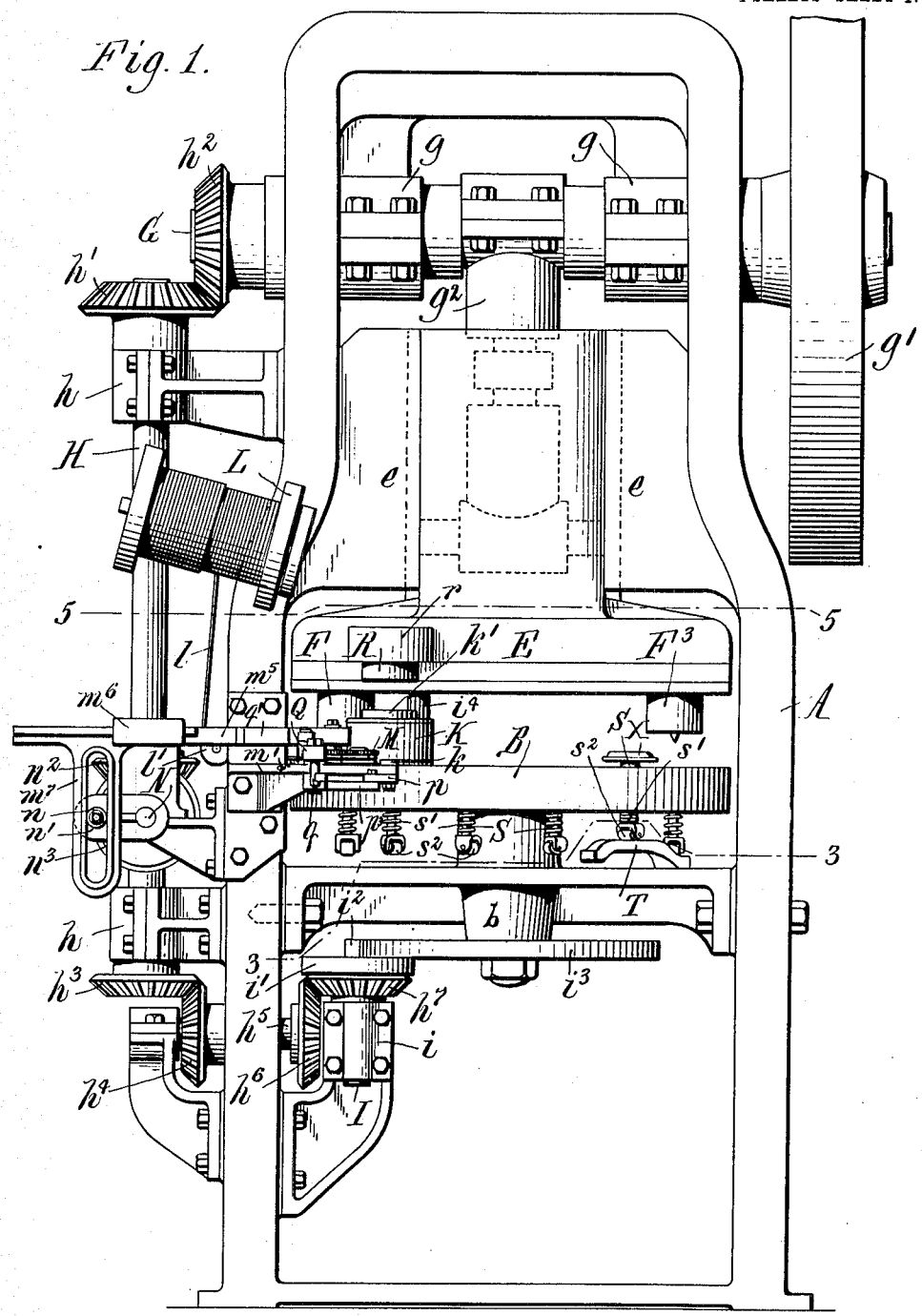

No. 860,302. PATENTED JULY 16, 1907.
O. J. JOHNSON.
MACHINE FOR EDGING CAN CAPS WITH SOLDER RIMS.
APPLICATION FILED JUNE 26, 1905.

4 SHEETS—SHEET 1.

Witnesses:
E. A. Volk.
R. W. Renser.

Inventor.
O. J. Johnson.
by Wilhelm, Parker & Hard.
Attorneys.

No. 860,302. PATENTED JULY 16, 1907.
O. J. JOHNSON.
MACHINE FOR EDGING CAN CAPS WITH SOLDER RIMS.
APPLICATION FILED JUNE 26, 1905.

4 SHEETS—SHEET 2.

Witnesses:
E. A. Volk.
R. W. Pinser

Inventor.
O. J. Johnson.
by Wilhelm, Parker & Hard
Attorneys.

No. 860,302. PATENTED JULY 16, 1907.
O. J. JOHNSON.
MACHINE FOR EDGING CAN CAPS WITH SOLDER RIMS.
APPLICATION FILED JUNE 26, 1905.
4 SHEETS—SHEET 3.
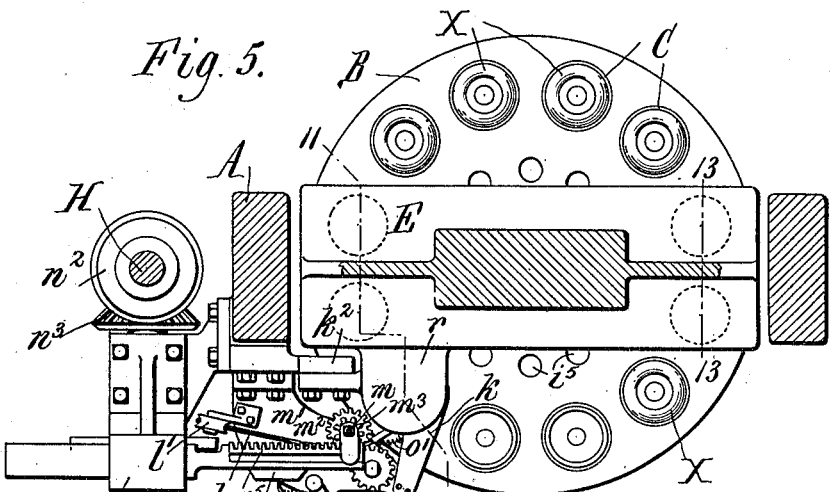
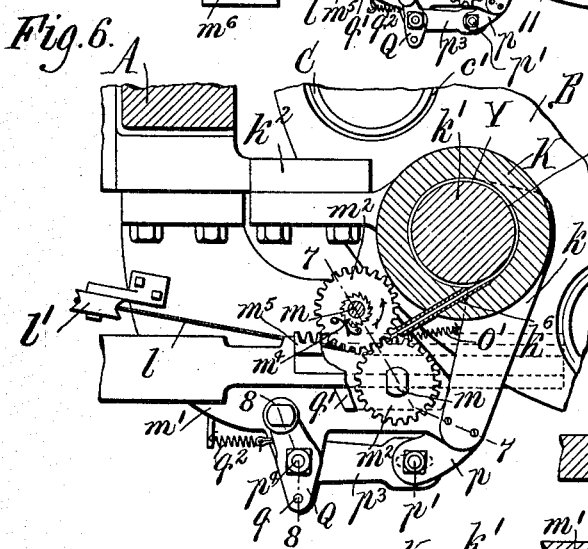
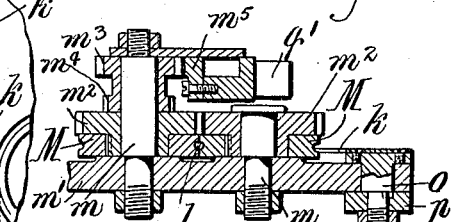
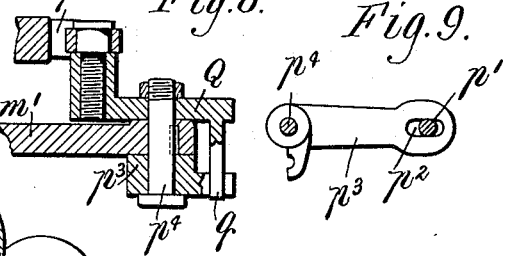
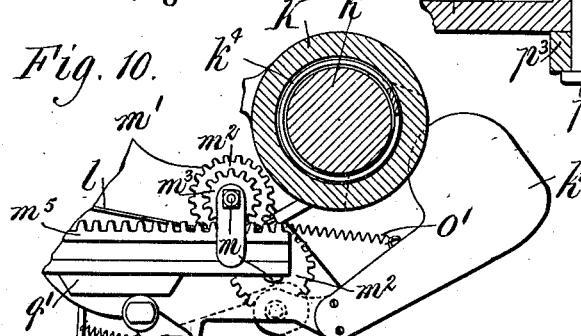
Witnesses:
E. A. Volk.
R. W. Runser.
Inventor.
O. J. Johnson.
by Wilhelm, Parker & Hard.
Attorneys

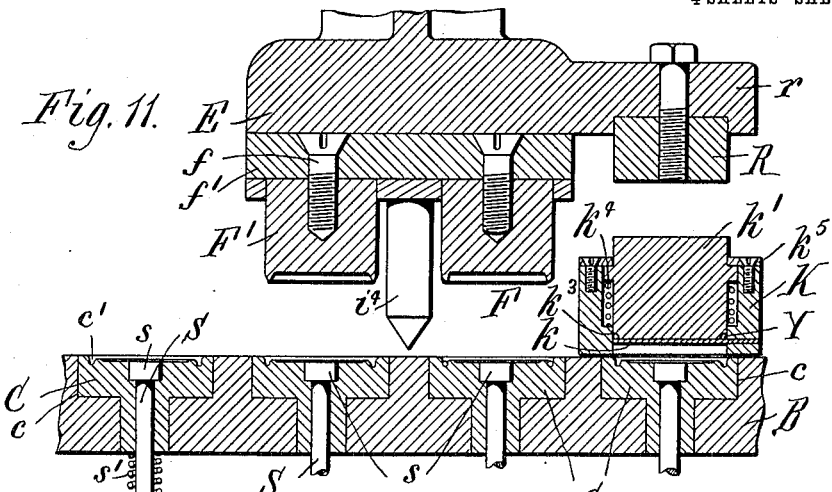
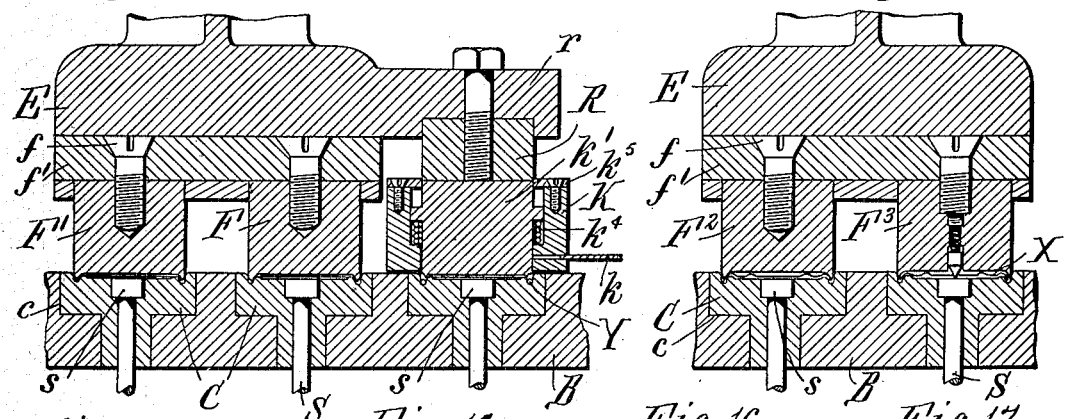
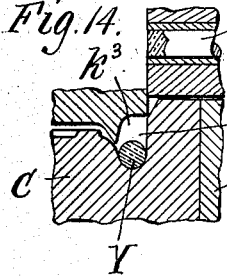
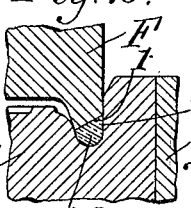
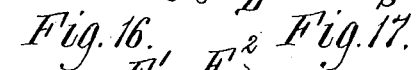
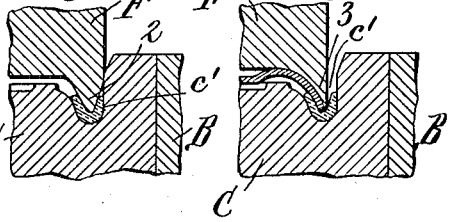
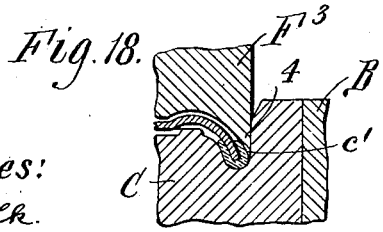
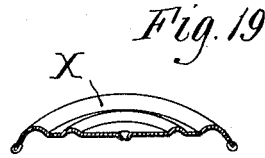

UNITED STATES PATENT OFFICE.

OLIVER J. JOHNSON, OF WHEELING, WEST VIRGINIA.

MACHINE FOR EDGING CAN-CAPS WITH SOLDER RIMS.

No. 860,302.        Specification of Letters Patent.        Patented July 16, 1907.

Application filed June 26, 1905. Serial No. 266,931.

*To all whom it may concern:*

Be it known that I, OLIVER J. JOHNSON, a citizen of the United States, residing at Wheeling, in the county of Ohio and State of West Virginia, have invented a new and useful Improvement in Machines for Edging Can-Caps with Solder Rims, of which the following is a specification.

This invention relates more particularly to machines for making and applying solder rims to the edges or margins of can caps. The solder rimmed cap of the kind made by machines according to this invention is placed over the mouth of the can with its downturned solder-bound edge surrounding the upturned lip of the can, and the solder rim is heated to unite the can and cap.

One of the primary objects of the invention is to produce a rapid, efficient machine for making the solder rims from wire solder and applying them to the caps, thereby preventing waste of solder and reducing the expense of edging the caps. The solder rim described in this application is folded over the edge of the cap, or has inner and outer flanges which embrace the edge of the cap to retain the rim thereon. When the cap is applied to the can the inner flange of the solder rim lies between the edge of the cap and the lip of the can, and as it is this flange which principally furnishes the solder to unite the can and cap, the outer flanges of the rim should contain only enough solder to retain the rim on the cap in order to save solder and facilitate the amalgamation thereof with the can and cap. To accomplish this is another object of the invention.

Still another object of the invention is to improve machines for making and applying solder rims in the respects hereinafter specified and set forth in the claims.

The general organization and operation of the machine, briefly stated, is as follows: A continuous wire of solder is forced endwise into a circular form and thereby curled into a rim blank, which is severed from the wire and discharged into a die on an intermittently moving table or carrier. The die with the rim blank is placed by the movements of the die carrier beneath successive reciprocating die punches which groove or flange the rim blank. A cap is then placed in the die with its downturned edge in the groove of the rim after which the die carrier moves the die with the cap and rim beneath other die punches, which press the cap down in the grooves of the rim and compress the outer flange of the rim against the edge of the cap to secure the rim thereon. The rimmed cap is then ejected from the die and removed. The die carrier is provided with a series of dies, and a blank is placed in a die and the several steps of the die pressing are performed simultaneously in several dies, so that a cap is rimmed at each operation of the reciprocating die punches.

Figure 2:
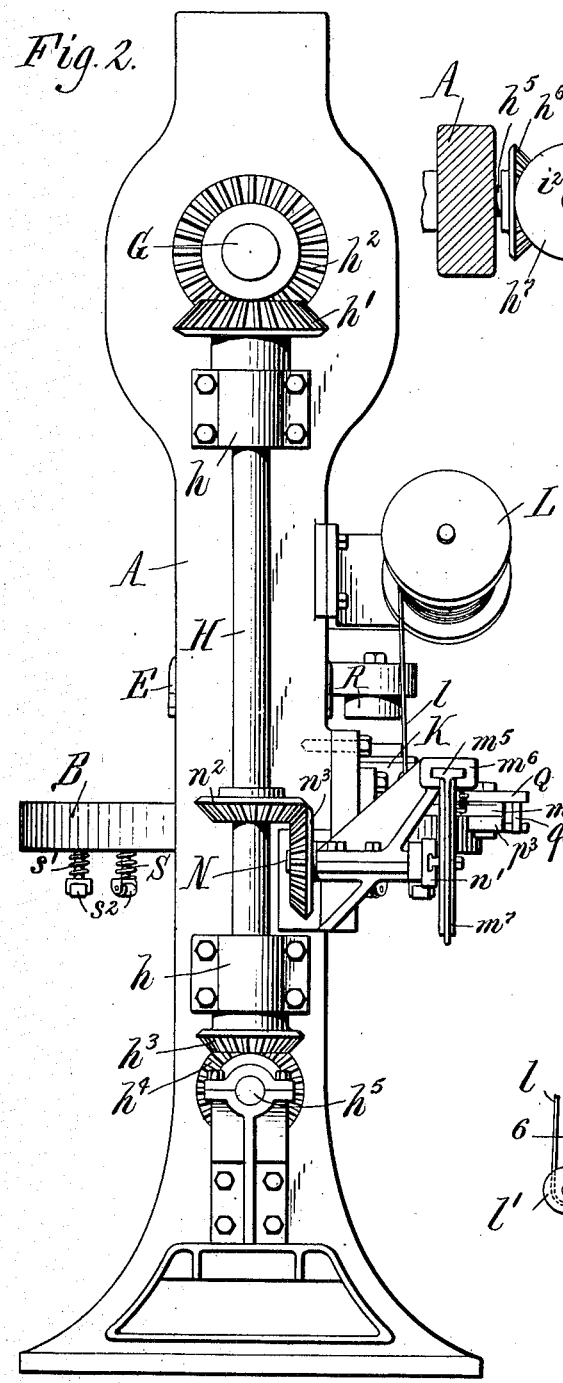
Figure 3:
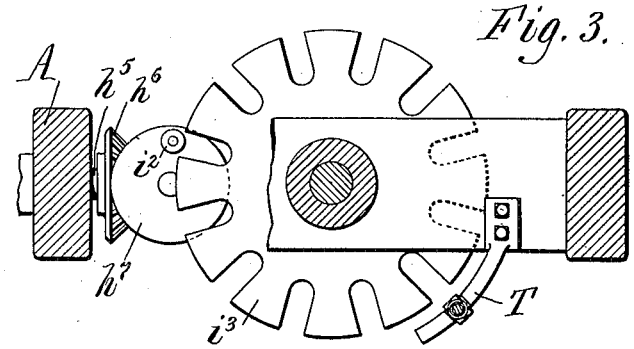
Figure 4:
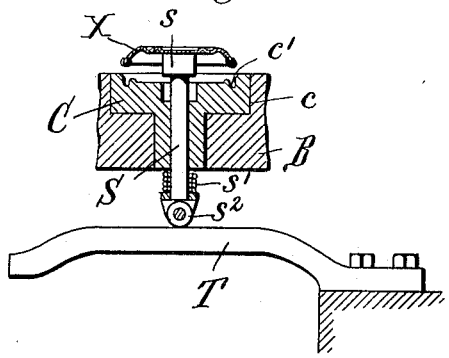
Figure 4A:
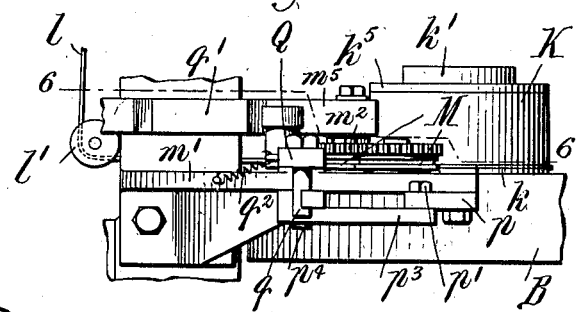

In the accompanying drawings, consisting of four sheets: Figure 1 is a side elevation of a machine for making and edging can caps with solder rims embodying the invention. Fig. 2 is a front elevation thereof. Fig. 3 is a horizontal section, partly in plan, in line 3—3, Fig. 1, showing the intermittent drive mechanism for the die carrier. Fig. 4 is a fragmentary sectional elevation, on an enlarged scale, showing the means for ejecting the rimmed caps from the dies. Fig. 4ᵃ is a fragmentary elevation, on an enlarged scale, of the wire feed and blank forming mechanism. Fig. 5 is a horizontal sectional plan of the machine in line 5—5, Fig. 1. Fig. 6 is a fragmentary horizontal sectional plan, on an enlarged scale, of the wire feed and blank forming mechanism, in line 6—6, Fig. 4ᵃ. Fig. 7 is a sectional elevation, on an enlarged scale, in line 7—7, Fig. 6. Fig. 8 is a sectional elevation, on an enlarged scale, in line 8—8, Fig. 6. Fig. 9 is a detail sectional plan, on an enlarged scale, of the angle lever for actuating the bottom plate of the blank form. Fig. 10 is a fragmentary plan partly in horizontal section, on an enlarged scale, of the wire feed and blank forming mechanism, showing the bottom of the blank form withdrawn. Fig. 11 is a sectional elevation, on an enlarged scale, of the die table, dies and punches, in line 11—11, Fig. 5, showing the punches raised. Fig. 12 is a similar view showing the punches lowered. Fig. 13 is a sectional elevation, on an enlarged scale, in line 13—13, Fig. 5, of two dies and the cap placing and finishing punches. Figs. 14–18 are enlarged fragmentary sections of the dies and punches, showing the five successive steps of forming the solder rim and applying it to the cap. Fig. 19 is a sectional perspective of a solder-rimmed can cap.

Like letters of reference refer to like parts in the several figures.

X, Fig. 19, represents one-half of a solder-rimmed can cap such as produced in the machine forming the subject of this application.

A represents the main frame of the machine, which may be of any suitable construction, and B a horizontal die carrier or table which has a central shaft journaled in a suitable bearing $b$ on the frame to rotate horizontally. The table is provided with a circular series of dies C which are preferably removably seated in pockets or depressions $c$ in the top of the table. The dies, see Figs. 11–18, are alike and each has a raised central portion on which the can cap X is placed and centered, and a surrounding circular groove or depression $c'$ in which the rim blank Y is formed and compressed on the downturned edge of the cap which depends into the rim groove.

E represents a punch head arranged in the machine to reciprocate toward and from the table in suitable vertical guides or ways $e$ on the frame. The head is provided with a series of male dies or punches F F' F² F³ which coöperate with the dies on the table to shape the solder rim and secure it on the cap. In the machine shown there are four of these punches arranged in pairs at opposite sides of the head and they are shaped, as hereinafter described, to press and apply the solder rim in four successive steps, but the number and form of die punches could be varied to make and apply the rim in a greater or less number of operations. The punches are removably and releasably secured to the head in any suitable manner. As shown they are secured by screws $f$ to a holding plate $f'$ detachably secured to the head E.

The punch head is reciprocated toward and from the die table and the latter is intermittently rotated to place the dies successively in operative position below the successive punches in the machine shown in the drawings by the following drive mechanism (see Figs. 1–3): G represents a horizontal drive shaft which is journaled in suitable bearings $g$ in the main frame above the punch head and is provided with a drive pulley $g'$. The shaft is connected to the punch head by an ordinary adjustable pitman $g^2$ having an eccentric or crank connection with the drive shaft so that the head is reciprocated once for each revolution of the drive shaft. H represents a vertical counter-shaft which is journaled in suitable bearings $h$ on the frame. The counter shaft is geared at its upper end to the drive shaft by intermeshing bevel gear wheels $h'$ $h^2$ on said shafts and is geared at its lower end by bevel gear wheels $h^3$ $h^4$ to a horizontal shaft $h^5$ which is journaled in suitable bearings on the frame and is connected by bevel gear wheels $h^6$ $h^7$ with a short vertical shaft I journaled beneath the die table in a bearing bracket $i$ on the frame. This shaft I is provided at its upper end with a drive wheel $i'$ having a stud or roller $i^2$ adapted to enter the notches of a star wheel $i^3$ secured to the lower end of the depending journal of the die table. The drive wheel $i'$ revolves at the same speed as the drive shaft and at each revolution turns the star wheel and the die table connected therewith a distance sufficient to carry a die from operative position beneath the first punch F to operative position beneath the second punch F'. The parts of the drive mechanism are so related and proportioned that the table is moved after the punches are lifted out of the dies and is brought to rest again before the punches are again lowered into the dies. The distance between the dies on the table, the punches F F' and the punches $F^2$ $F^3$ is the same so that in each rest position of the table a die is in operative relation to each punch. To center the dies accurately beneath the punches and hold the table from movement in its rest position, the punch head is provided with a lock pin $i^4$, Figs. 1 and 11, having a tapered lower end adapted to enter a circular series of holes $i^5$, Fig. 5, in the die table each time the head descends. Any other suitable mechanism may be employed for operating the punch head and die table and locking the latter from movement in its rest position.

K, Figs. 1, 6, 11 and 12, represents the form in which the circular rim blanks are made. The blank form consists of an upright open ended cylinder or body, a horizontally movable blank support or bottom plate $k$ which is moved into and out of the cylinder through a slot in the side of the cylinder, and a vertically movable plunger $k'$. The body of the blank form may be supported over and close to the die table by a bracket $k^2$, Fig. 6, projecting from the frame, or by any other suitable means, and is located in advance of the first punch F in such position as to be directly over one of the dies when the table stops. The plunger $k'$ has a circular groove $k^3$ around its lower end and is normally held up just above the plane of the movable bottom plate, as by a coil spring $k^4$ surrounding the plunger within the body and bearing at opposite ends against shoulders on the body and plunger. A ring or flange $k^5$ at the top of the body engages a shoulder on the plunger to limit its upward movement and arrest it in such position that its lower end just clears the movable bottom plate. The bottom plate and groove $k^3$ of the plunger make a circular cavity in the form into which the wire solder is forced through a tangential hole $k^6$, Fig. 6, in the body of the form and by which it is curled into a blank of the shape of said cavity. The wire solder is forced into the blank form by suitable feed mechanism which in the machine illustrated is constructed as follows:

L, Figs. 1 and 2, represents a spool of wire solder which is rotatably supported on a suitable spindle and from which the wire solder $l$ is led around a guide wheel $l'$, Figs. 1, 5 and 6, and passed between two grooved feed wheels M, Figs. 1, $4^a$ and 7, into the tangential inlet hole of the blank form. Round solder wire is shown in the drawings, but this cross sectional shape of the wire or strip is not necessarily essential. The feed wheels are journaled on upright axles $m$ secured to a bracket $m'$ on the main frame and are connected by gear wheels $m^2$ formed therewith or secured thereto so as to be positively rotated together in opposite directions to grip and feed the solder wire forward. A gear pinion $m^3$ is loosely journaled on the axle of one of the feed wheels and is connected to said feed wheel by a ratchet and pawl $m^4$ or other device for causing the feed wheels to rotate forwardly with the gear pinion while allowing the pinion to be turned in the opposite direction independently of the feed wheels. The pinion $m^3$ is rotated by a reciprocating toothed rack $m^5$ which is supported and slides in a guide hole in a bracket $m^6$ secured to the main frame. The toothed rack is provided with a depending leg $m^7$ having a slot in which works a crank pin and roller $n$ secured to a crank arm $n'$ on a horizontal shaft N, which is journaled in the bracket $m^6$ and is driven from the vertical counter shaft H by intermeshing bevel gear wheels $n^2$ $n^3$, Figs. 2 and 5. The rack $m^5$ is reciprocated by the crank $n'$ and in each forward movement turns the pinion $m^3$ and the feed wheels, thereby forcing a sufficient length of the solder wire into the blank form to make a complete blank or ring. In the return movement of the rack the feed wheels do not turn with pinion $m^3$ and prevent the withdrawal of the solder wire from the blank form. The crank pin $n$ is adjustably secured to the crank arm and by the proper adjustment thereof the movement of the rack can be regulated to feed the proper length of solder wire into the blank form. Any other suitable mechanism for feeding the solder wire into the blank form could be employed.

After the formation of the rim blank, the bottom plate of the blank form is withdrawn and the blank is severed from the wire and pushed out of the form into a die located beneath the form. In the construction shown, the bottom plate is secured to the upper end of a rock-shaft O, Fig. 7, journaled in a bearing in the bracket $m'$, and a suitable spring O' connecting the bottom plate and the bracket normally holds the bottom plate in the form, as shown in Figs. 5 and 6, and returns it to this position after it has been withdrawn. The rock-shaft O carrying the bottom plate has at its lower end an arm $p$ provided with a pin $p'$ which depends into a slot $p^2$ in one arm of an angle lever $p^3$ which is fulcrumed on a post $p^4$ secured in the bracket $m'$. A tappet lever Q is pivoted on the upper end of the post $p^4$ and has at one end a depending pin $q$ which bears against the other arm of the angle lever $p^3$. The other end of the tappet lever Q is equipped with an antifriction roller which extends into the path of a projection $q'$ on the toothed rack $m^5$. The tappet lever is returned after oscillation to the normal position shown in Fig. 6 by a suitable spring $q^2$. When the toothed rack $m^5$ is moved forwardly to feed the solder wire into the blank form, its projection $q'$ oscillates the tappet lever Q away from the angle lever $p^3$ but does not move the angle lever and bottom plate connected therewith, and the plate remains stationary in the blank form. In the return movement of the rack its projection swings the tappet lever to the position shown in Fig. 10, thus rocking the angle lever and withdrawing the bottom plate $k$. The projection on the rack holds the tappet lever in position to hold the bottom plate out of the blank form while the plunger $k'$ descends to sever and eject the blank, and the projection then moves out of engagement with the tappet lever, permitting the bottom plate to be again moved into the form by its spring. The bottom plate could be similarly actuated by mechanism of different construction. The bottom plate $k$ is not absolutely essential to the operation of the machine, as the blank will be retained in the form by friction until it is forcibly ejected.

The plunger of the blank form may be depressed by any suitable means. The means employed in the machine shown in the drawings consists of a cylindrical block R, Figs. 1, 2 and 11, secured to a projection $r$ on the punch head directly over the blank form. The punch head descends while the bottom of the blank form is withdrawn and the plunger of the blank form is lowered by the block R, its lower edge coöperating with the edge of the wire feed hole in the body of the blank form to sever the blank from the wire. The continued movement of the plunger pushes the rim blank out of the blank form into the die which is below the blank form, see Fig. 12.

When the punch head rises, the table turns and places the die with the rim blank beneath the first punch F. This punch has a bevel faced flange 1 which presses the blank into the cross-sectional shape shown in Fig. 15, forming a beveled upper face thereon. When the head rises again the table is moved another step and places the die and blank beneath the second punch F' which has a tapered circular flange 2 which presses the groove in the rim blank or forms the inner and outer flanges thereon. The flange 2 of this punch is shaped so as to throw the preponderance of the solder into the inner flange and make this inner flange of uniform thickness throughout its width while making the outer flange tapering and of less width than the inner flange, as clearly shown in Fig. 16. The next movement of the table carries the die with the solder rim from beneath the punch head and it remains exposed during several successive movements of the table, thus affording ample time for the cap to be placed in the die. Automatic means could be provided for feeding the caps into the dies, but the machine illustrated is not equipped with cap feed mechanism and the caps are placed in the dies manually by an operative. The die with cap and rim is moved at the proper time beneath the third punch $F^2$ which has a flange 3 properly shaped to press the downturned edge of the cap down snugly into the grooved solder rim, as shown in Fig. 17, at the next descent of the punch head, and at the next movement of the table the die is placed beneath the finishing punch $F^3$, the circular flange 4 of which is shaped to compress the outer flange of the solder rim inwardly against the edge of the cap and complete the operation of applying the rim. The table then moves the die from beneath the punch head at the opposite side where the rimmed cap can be removed by hand or suitable mechanism, not shown.

Cap ejectors or releasing means are provided for lifting the caps out of the dies so that they can be readily removed. As shown, each die C has a cap ejector rod S movable vertically in a central hole in the die and having a head $s$ which is normally held down in a depression in the die by a spring $s'$ surrounding the ejector rod between the die and an enlargement on the ejector rod. The latter projects below the die table and has an anti-friction roller $s^2$ which, after the die moves from beneath the last punch, rolls up on a stationery cam or track T, Figs. 1 and 4, which elevates the ejector rod and lifts the cap out of the die, as shown in Fig. 4. The roller of the ejector rod moves off of the cam T and the ejector rod is lowered by its spring before the die is again brought beneath the blank form to receive the next rim blank. The dies with their ejectors can be lifted out of the holes in the die table to be replaced by other dies.

The steps of the operation described are performed in the several dies successively and a rim blank is formed and placed in one die and a rimmed cap is removed from another die at each stop of the die table.

In a solder rim shaped as described there is sufficient solder in the inner flange to insure a perfect joint between the can and cap but only a minimum amount of solder in the outer flange. The rims can be formed from a wire of small gage and there is practically no waste of solder. Furthermore, the outer flange of the rim being thin, less heat and time are required to heat the inner flange to the temperature necessary to amalgamate the solder of the inner flange with the can and cap.

While, in the machine described, the parts are constructed and arranged to make flanged rims and apply them to the caps so that they embrace or inclose the edges of the caps, rims of other shape could be made and applied to caps simply by the provision of dies of suitable shape and arrangement. The invention is therefore not necessarily limited to the production and application of flanged rims. Furthermore, while the stated purpose of the machine is to make and apply solder rims to can caps, the machine could also be employed for making flanged rims for other purposes and applying them to articles other than circular can caps.

I claim as my invention:

1. The combination of mechanism for bending or curling a wire into a rim-blank and forming the blank to embrace the edge of an article, and means for compressing the rim on the edge of the article to secure it thereto, substantially as set forth.

2. The combination of mechanism for bending or curling a wire into a rim-blank, means for forming said blank into a flanged rim, and means for applying said flanged rim to the edge of an article, substantially as set forth.

3. The combination of means for bending or curling a wire or strip into a rim-blank, means for severing said rim-blank from the wire or strip, means for forming said rim-blank into a flanged rim, and means for applying said flanged rim to the edge of an article, substantially as set forth.

4. The combination of means for curling or bending a wire into a rim-blank, means for forming said blank into a flanged rim, means for applying said rim to the edge of an article, and operating mechanism for said blank and rim forming and rim applying means, substantially as set forth.

5. The combination of means for bending or curling a wire into a rim-blank and severing said blank from the wire, means for forming said blank into a flanged rim, means for applying said rim to the edge of an article, and operating mechanism for said blank and rim forming and rim applying means, substantially as set forth.

6. In a machine for providing caps or the like with flanged rims, the combination of means for forming a wire into a blank of the circumferential shape of the cap, means for flanging said blank, means for securing said flanged blank on the cap, and operating mechanism for said blank forming and flanging means, substantially as set forth.

7. In a machine for providing caps or the like with flanged rims, connected mechanism for forming a wire into a blank of the circumferential shape of the cap, flanging said blank and securing the flanged blank on said cap in successive operations, substantially as set forth.

8. The combination of a form, means for forcing the wire endwise into said form to curl it into a blank of the shape of the form, means for severing said blank from the wire, means for forming said blank into a flanged rim, and operating mechanism for said several means, substantially as set forth.

9. The combination of a circular form, means for forcing a wire into said form to curl it into a circular blank, means for severing said blank from the wire and moving it out of said form, means for forming said blank into a flanged rim, and operating mechanism for said several means, substantially as set forth.

10. The combination of a circular form, means for forcing a wire into said form to curl it into a circular blank, means for severing said blank from the wire and moving it out of said form, means for forming said blank into a flanged rim, means for closing the flanges of said rim over the edge of a cap, and operating mechanism for said several means, substantially as set forth.

11. The combination of a form in which a wire is made into a circular blank, a movable die, means for severing said blank from the wire and moving the blank into said die, means for pressing said blank into a flanged rim in said die, and mechanism for operating said several means, substantially as set forth.

12. The combination of a form in which a wire is made into a circular blank, a movable die, means for severing said blank from the wire and moving the blank into said die, means for pressing said blank into a flanged rim in said die, means for closing the flanges of said rim over the edge of a cap, and mechanism for operating said several means, substantially as set forth.

13. The combination of a circular form, means for forcing a wire into said form to curl it into a circular blank, means for severing said blank from the wire and moving it out of said form, a die to receive said blank from said form, punches for flanging said blank and closing the flanges of the blank over the edge of a cap in said die, and mechanism for operating said die and punches, substantially as set forth.

14. The combination of a circular form, means for forcing a wire into said form to curl it into a circular blank, a die, means for severing said blank from the wire and moving it into said die, means for forming said blank into a flanged rim in said die, pressing a cap into the flanged blank in said die, and closing the flanges of the blank over the edge of the cap, and mechanism for operating said die and punches, substantially as set forth.

15. The combination of a circular form, means for forcing a wire into said form to curl it into a circular blank, a plunger for severing said blank from the wire and moving it out of said form, a reciprocating head provided with a series of punches and means for operating said plunger, a die, and mechanism for moving said die opposite to said form to receive said blank and then successively opposite to said punches, which coöperate with said die to flange said blank and close the flanges over the edge of a cap, substantially as set forth.

16. The combination of a form having a blank curling cavity, a movable blank support, and a movable plunger, and mechanism for feeding a wire into said form, withdrawing said blank support and operating said plunger to sever said blank from the wire and eject the blank, substantially as set forth.

17. The combination of a form having a blank curling cavity, and a movable blank support, means for feeding a wire into said form, and means actuated by said wire feed means for withdrawing said blank support to permit the discharge of said blank, substantially as set forth.

18. The combination of a form having a blank curling cavity, and a movable blank support, means for feeding a wire into said form, means actuated by said wire feed means for withdrawing said blank support, and means for ejecting the blank from said form, substantially as set forth.

19. The combination of a form having a blank curling cavity, wire feed wheels, a reciprocating rack geared to said feed wheels to feed the wire into said curling cavity, and actuating means for said rack which are adjustable to regulate the movement of the rack, substantially as set forth.

20. The combination of a form having a blank curling cavity and a movable blank support, wire feed wheels, a reciprocating rack geared to said feed wheels, and means actuated by said rack for moving said blank support to allow the discharge of said blank, substantially as set forth.

21. The combination of a form having a blank curling cavity and a movable blank support, wire feed wheels, a reciprocating rack geared to said feed wheels, a projection on said rack, a tappet lever having a part in the path of said projection, and a lever which is actuated by said tappet lever and is connected to said blank support, substantially as set forth.

22. The combination of a die for a rim blank, and a coöperating die punch having a portion shaped to form inner and outer flanges of unequal cross-section on said blank, and mechanism for applying said blank to the edge of an article, substantially as set forth.

23. The combination of a die for a rim blank and a coöperating die punch having a portion shaped to form a wide inner flange of substantially uniform thickness and a narrow tapering outer flange on said blank, and mechanism for applying said blank to the edge of an article, substantially as set forth.

24. The combination of a die for a rim blank, a coöperating die punch having a beveled face for producing a beveled face on said blank, and a second die punch having a portion shaped to form a wide inner flange and a narrow outer flange on said beveled face blank, and mechanism for applying said blank to the edge of an article substantially as set forth.

Witness my hand this 15th day of June, 1905.

OLIVER J. JOHNSON.

Witnesses:
JOS. P. WELLS,
J. LATAM MELAIN.